US012533582B2

(12) United States Patent
Aochi et al.

(10) Patent No.: US 12,533,582 B2
(45) Date of Patent: Jan. 27, 2026

(54) RECORDING MEDIUM AND INFORMATION PROCESSING DEVICE

(71) Applicant: SEGA TOYS CO., LTD., Tokyo (JP)

(72) Inventors: Yuichi Aochi, Tokyo (JP); Hirohiko Atobe, Yokohama (JP); Kazuaki Ichinohe, Yokohama (JP)

(73) Assignee: SEGA TOYS CO., LTD., Tokyo (JP)

( * ) Notice: Subject to any disclaimer, the term of this patent is extended or adjusted under 35 U.S.C. 154(b) by 284 days.

(21) Appl. No.: 18/251,125

(22) PCT Filed: Jul. 25, 2022

(86) PCT No.: PCT/JP2022/028574
§ 371 (c)(1),
(2) Date: Apr. 28, 2023

(87) PCT Pub. No.: WO2023/181437
PCT Pub. Date: Sep. 28, 2023

(65) Prior Publication Data
US 2024/0325890 A1 Oct. 3, 2024

(30) Foreign Application Priority Data
Mar. 22, 2022 (JP) ................................ 2022-045519

(51) Int. Cl.
*A63F 13/493* (2014.01)

(52) U.S. Cl.
CPC ...... *A63F 13/493* (2014.09); *A63F 2300/636* (2013.01)

(58) Field of Classification Search
CPC ......................... A63F 13/493; A63F 2300/636
USPC ........................................................... 463/24
See application file for complete search history.

(56) References Cited

U.S. PATENT DOCUMENTS 8,088,012 B2 * 1/2012 Dutilly .................. A63F 13/493 463/43
9,908,047 B2 * 3/2018 Gallizzi ................ A63F 13/352
11,083,963 B2 * 8/2021 Colenbrander ....... A63F 13/352
2006/0097987 A1 * 5/2006 Hughes ............... G06F 3/03543 345/156
2013/0122960 A1 * 5/2013 Kim .................. H04M 1/72412 455/566
2017/0050111 A1 * 2/2017 Perry .................... H04L 67/131

FOREIGN PATENT DOCUMENTS

JP 2001-149657 A 6/2001

* cited by examiner

*Primary Examiner* — Allen Chan
(74) *Attorney, Agent, or Firm* — Maier & Maier, PLLC

(57) ABSTRACT

A recording medium and an information processing device. The recording medium has recorded a program that causes a computer to function as: a save accepting unit that accepts a saving operation from a player on a play screen of a game; a registration unit that registers, as saved data, progress of the game at timing when the saving operation is performed, every time the saving operation is performed; a load accepting unit that accepts a load operation of the saved data from the player on the play screen; and a control unit that loads the registered saved data in chronological order every time the load operation is performed, and restarts the game by switching the play screen.

5 Claims, 5 Drawing Sheets

RECORDING MEDIUM AND INFORMATION PROCESSING DEVICE

CROSS REFERENCE TO RELATED APPLICATION

This application claims the priority benefit of Japanese Patent Application No. 2022-045519 filed on Mar. 22, 2022, which is incorporated herein by reference in its entirety.

FIELD

The present invention relates to a recording medium and an information processing device.

BACKGROUND

Conventionally, game systems that can save the progress of games have been known.

In this regard, Japanese Laid-Open Patent Publication No. 2001-149657 discloses a technology that allows a player to select and load desired saved data from among a plurality of saved data and thereby to play a game based on the saved data.

Patent Literature

Patent Literature 1: JP 2001-149657 A

SUMMARY

In such a game, it is necessary to start a screen different from a play screen of the game (e.g., a save screen or loading screen) to perform an operation related to saving or loading, which is a troublesome operation requiring labor.

Furthermore, such a game accepts selection of saved data, which is to be loaded, on the loading screen different from the play screen of the game. Because of this, for example, in highly real-time games (e.g., shooting games, action games, music games, racing games, etc.), when shifting from a loading screen to a play screen, a player may be immediately attacked by an enemy object (an enemy character) or may not be able to play the game with leeway, reducing the immersion of the player in the game.

The present invention has been made in view of these problems, and its object is to provide a recording medium and an information processing device that can reduce the player's operation labor to avoid reducing the immersion of the player in a game.

To solve the problems described above, a recording medium according to a first aspect of the present invention is a computer-readable recording medium having recorded therein a program that causes a computer to function as: a save accepting unit that accepts a saving operation from a player on a play screen of a game; a registration unit that registers, as saved data, progress of the game at timing when the saving operation is performed every time the saving operation is performed; a load accepting unit that accepts a loading operation of the saved data from the player on the play screen; and a control unit that loads the registered saved data in chronological order every time the loading operation is performed, and restarts the game by switching the play screen.

In a second aspect of the present invention, the saving operation and the loading operation are operations for the same operating tool.

In a third aspect of the present invention, the saving operation includes an operation for the operating tool and a release of the operation, and the loading operation is continuation of the operation for the operating tool.

In a fourth aspect of the present invention, the load accepting unit determines whether or not the operation for the operating tool is further continued after receiving the loading operation, and every time the determination is affirmative, the control unit loads the registered saved data in chronological order and switches the play screen.

In a fifth aspect of the present invention, the control unit loads the registered saved data in the order of newest to oldest every time the loading operation is performed.

In a sixth aspect of the present invention, the game is any of a shooting game, an action game, a music game, and a racing game.

A recording medium according to a seventh aspect of the present invention is a computer-readable recording medium having recorded therein a program that causes a computer to function as: a registration unit that automatically registers progress of a game as saved data if a predetermined condition is satisfied during playing of the game; a load accepting unit that accepts a loading operation of the saved data from a player on a play screen of the game; and a control unit that loads the registered saved data in chronological order every time the loading operation is performed, and restarts the game by switching the play screen.

An information processing device according to an eighth aspect of the present invention includes: a save accepting unit that accepts a saving operation from a player on a play screen of a game; a registration unit that registers, as saved data, progress of the game at timing when the saving operation is performed, every time the saving operation is performed; a load accepting unit that accepts a loading operation of the saved data from the player on the play screen; and a control unit that loads the registered saved data in chronological order every time the loading operation is performed, and restarts the game by switching the play screen.

An information processing device according to a ninth aspect of the present invention includes: a registration unit that automatically registers progress of a game as saved data if a predetermined condition is satisfied during playing of the game; a load accepting unit that accepts a loading operation of the saved data from a player on a play screen of the game; and a control unit that loads the registered saved data in chronological order every time the loading operation is performed, and restarts the game by switching the play screen.

According to the present invention, the player's operation labor can be reduced to avoid reducing the immersion of the player in the game.

DETAILED DESCRIPTION

Hereinafter, embodiments of the present invention will be described with reference to the accompanying drawings. To make the explanation easier to understand, identical components and steps in respective drawings are denoted by the same signs as much as possible, and a duplicate description thereof is omitted below.

<Hardware Configuration>

Figure 1:
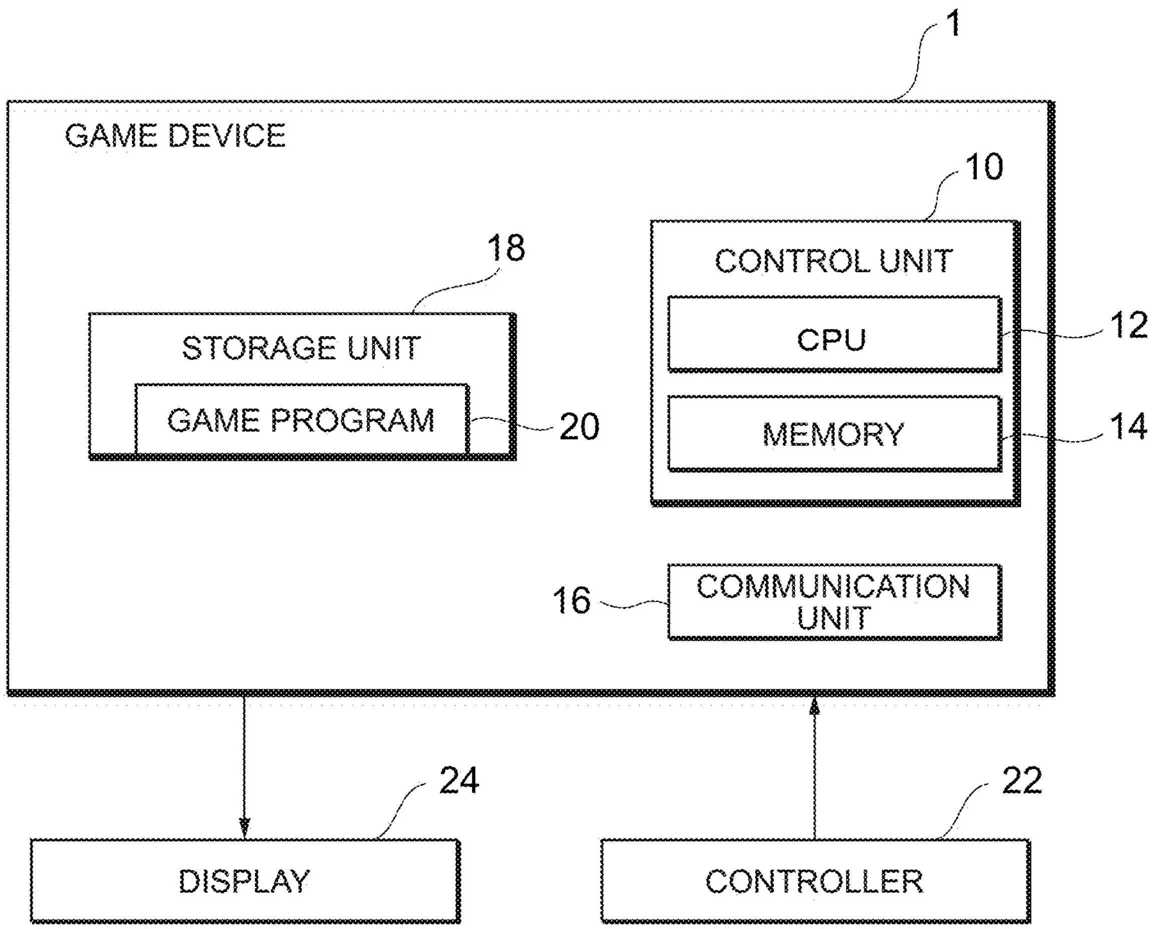
FIG. 1 is a diagram schematically showing an example of a hardware configuration of a game device.

FIG. 1 is a diagram schematically showing an example of a hardware configuration of a game device 1.

As shown in FIG. 1, the game device 1 is a device that provides a game to a player. The game device 1 includes a control unit 10, a communication unit 16, and a storage unit 18. The control unit 10 is mainly composed of a CPU (Central Processing Unit) 12 and a memory 14. For example, the game device 1 can execute any of a shooting game, an action game (e.g., a fighting game), a music game, a racing game, etc. Each of the storage unit 18 and the memory 14 is composed of a non-transient, computer-readable recording medium (storage medium). The storage unit 18 and the memory 14 store programs and data that are necessary for the control unit 10 to control each component.

The game device 1 is, for example, an information processing device (computer) that reads a game program 20 stored in the storage unit 18 into the memory 14 and executes the game. As the game device 1, various devices such as video game machines, portable game machines, arcade game machines, smart phones, tablets, and personal computers, are mentioned. In this embodiment, the game device 1 executes the game program 20 and causes a display 24 to output execution results of the game (image data, audio data, etc.) based on operation information (an operation signal) operated by a controller 22. The controller 22 includes, for example, a plurality of operating tools or oscillators (e.g., a vibration function). Examples of the operating tool include a joystick, a button (switch, key), a touchpad (touch panel), and the like. In this embodiment, the controller 22 includes one joystick and six buttons (A button to F button). The operation information includes, for example, on/off operation signals for eight directions (top, top right, right, bottom right, bottom, bottom left, left, top left) of the joystick and on/off operation signals for the respective buttons.

The game program 20 may be stored in various storage media inserted into the game device 1. The game device 1 may include a plurality of (for example, two) controllers 22. The game device 1 and the controller 22 may be connected wirelessly. The game device 1 may be integrated with the controller 22 or the display 24.

In the control unit 10, the CPU 12 functions as various functional means by executing a predetermined program stored in the memory 14 or the storage unit 18, etc. These functional means will be described in detail below.

The communication unit 16 is composed of a communication interface and the like for communicating with an external device. For example, the communication unit 16 downloads a game program from an external device (e.g., a game server) and stores it in the storage unit 18. The communication unit 16 communicates operation information, etc., with other game devices when a multiplayer game or the like is executed by a plurality of game devices 1.

The storage unit 18 is composed of a hard disk or the like. The storage unit 18 stores various programs and various types of information that are necessary for execution of processing in the control unit 10, including the game program 20, and information about the processing result.

The game device 1 can be implemented using an information processing device such as a dedicated or general-purpose server and computer. The game device 1 may be composed of a single information processing device or may be composed of a plurality of information processing devices distributed over a communication network NT. FIG. 1 shows only portions of the main hardware configuration that the game device 1 has, and the game device 1 can have any other configuration that the server generally has.

<Game Overview>

The game according to this embodiment is a shooting game in which a player object (player character) is manipulated to attack (destroy) enemy objects by hitting them with bullets while avoiding bullets (e.g., barrage) fired from the enemy objects (e.g., characters, tanks, gun batteries, and the like).

Figure 2:
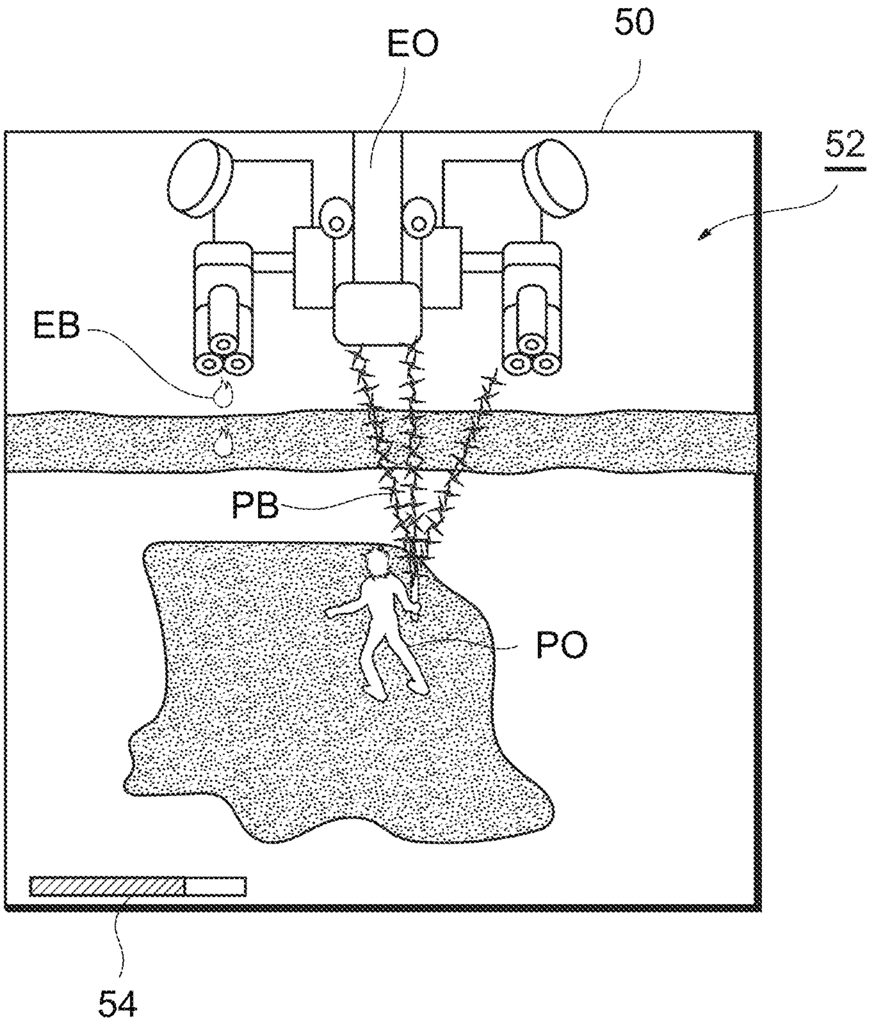
FIG. 2 is a diagram showing an example of a play screen displayed in the game device.

FIG. 2 is a diagram showing an example of a play screen 50 displayed in the game device 1.

As shown in FIG. 2, for example, a game space 52 and an HP display bar 54 are displayed on the play screen 50.

In the game space 52, a player object PO, an enemy object EO, bullet objects PB fired by the player object PO, and bullet objects EB fired by the enemy object EO are represented. The HP display bar 54 is a bar that displays a hit point (HP) of the player object PO.

In the game space 52 displayed on the play screen 50 described above, the player object PO moves in the game space 52 based on a player's moving operation (for example, the operation of a joystick in one direction). By this moving operation, the player object PO can avoid the bullet object EB fired by the enemy object EO. The player object PO fires the bullet object PB based on a player's firing operation (e.g., the pressing of the A button or B button) to attack the enemy object EO and thus reduces the hit point of the enemy object EO. The game then continues, for example, until the hit point of the player object PO becomes 0 or less (uncombattable) or until the hit point of a boss object (the enemy object EO) in the final stage becomes 0 or less (uncombattable).

<Functional Configuration>

Specific Example 1

Figure 3:
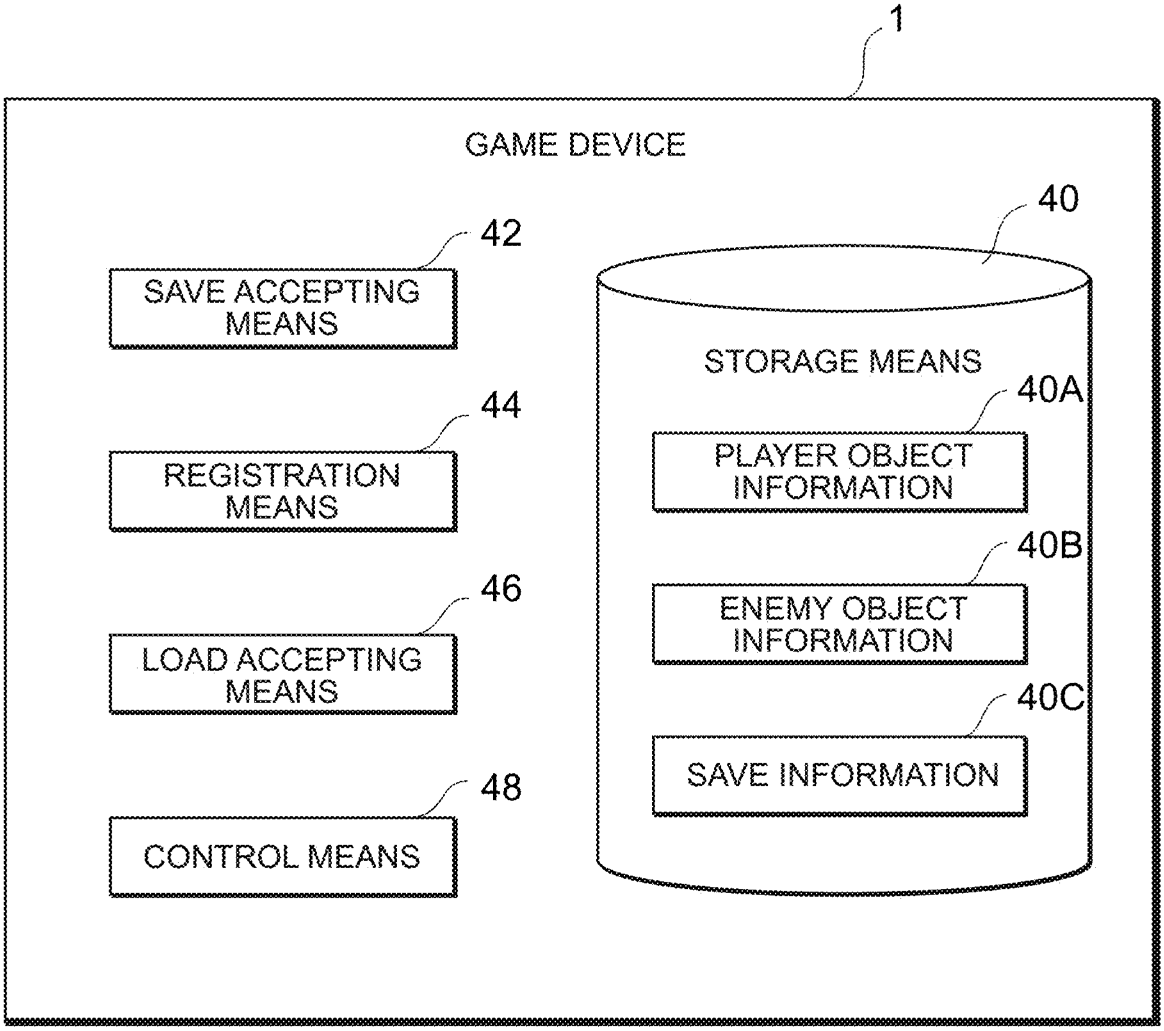
FIG. 3 is a block diagram schematically showing an example of a functional configuration of the game device.

FIG. 3 is a block diagram schematically showing an example of a functional configuration of the game device 1.

As shown in FIG. 3, the game device 1 includes functional configurations, such as storage means 40, save accepting means 42, registration means 44, load accepting means 46, and control means 48. The storage means 40 is implemented by the memory 14 and/or one or more storage units 18. The functional configuration other than the storage means 40 is implemented by causing the control unit 10 to execute the game program 20 stored in the storage unit 18 or the like. Note that the storage means 40, the save accepting means 42, the registration means 44, the load accepting means 46, and the control means 48 in this embodiment may be read as the storage unit 40, the save accepting unit 42, the registration unit 44, the load accepting unit 46, and the control unit 48.

The storage means 40 has the function of storing player object information 40A, enemy object information 40B, save information 40C, and the like.

The player object information 40A includes image data, an initial hit point, etc., about the player object PO.

The enemy object information 40B includes image data, an initial hit point, an appearance position, action information, etc., about the enemy object EO in association with an enemy object ID of the enemy object EO for each enemy object EO. The appearance position includes the position coordinates where the enemy object EO appears in the game space 52. As the action information, appearance conditions and action contents are described. Examples of the appearance conditions include the approach of the player object PO within a predetermined range from the appearance position of the enemy object EO, the display of this appearance position on the play screen 50, and the like. The action contents include scripts, etc., for the enemy object EO to move toward the position coordinates or the like of the player object PO or to fire the bullet object EB. For example, the action contents include a movement pattern of the enemy object EO, a firing pattern of the bullet object EB, the size of the bullet object EB (for example, a damage determination area), the orientation and movement speed of the bullet object EB (for example, the movement vector), an amount of damage of the bullet object EB (for example, an amount of decrease in the hit point), and the like.

The save information 40C includes the progress of a game (saved data). This progress (saved data) is loaded by the control means 48, whereby the game is restarted (resumed) on the play screen. In this embodiment, examples of the progress include saved date and time, play time, the number of stages, an area of the game space 52 displayed on the play screen, object information, and the like. The object information includes, for example, position coordinates, orientation, moving speed, residual hit points, etc., of the player object PO and the enemy object EO in the game space. Further, the object information includes, for example, position coordinates, size, orientation, moving speed, the amount of damage, etc., of the bullet object PB and the bullet object EB.

In this embodiment, the save information 40C has 7 save slots (save slot A to save slot G). For example, in this embodiment, the saved data is stored in chronological order (for example, in the order of newest to oldest) from the save slot A to the save slot G. Specifically, the newest saved data is stored sequentially starting from the save slot A. That is, the save slot A stores the saved data whose saved date and time is the newest, and the save slot G stores the saved data whose saved date and time is the oldest. The details of the save slot will be described later.

The save accepting means 42 is functional means for accepting a saving operation from a player. In this embodiment, the save accepting means 42 accepts the saving operation from a player on the play screen of the game.

For example, the save accepting means 42 determines whether or not to accept the saving operation from the player. The saving operation is an operation for the operating tool included in the controller 22 (e.g., an ON operation) and a release of the operation (e.g., an OFF operation). Examples of the operating tool include a joystick, a button, and the like. This saving operation means that after an operation (for example, the ON operation) for an operating tool associated with the saving operation is performed within a predetermined period (e.g., one second), then this operation is released (for example, the OFF operation). The saving operation includes, for example, a short-time operation of the joystick in one direction or short-time pressing of the button.

Note that the operating tool is preferably one operating tool that is not associated with a playing operation of the game (e.g., the moving operation of the player object PO and the firing operation of the bullet object PB). In this embodiment, the saving operation is an ON/OFF operation of one button (e.g., the C button) that is not associated with the playing operation of the game.

The registration means 44 is a functional means for registering (saving) the progress of the game in the save information 40C. In this embodiment, every time the saving operation is performed, the registration means 44 registers, as saved data, the progress of the game at the timing when the saving operation is performed. Every time the saved data is registered, the registration means 44 may output (reproduce) audio to be saved or output (display) an image showing that the saving has been performed, on the play screen. That is, the registration means 44 may notify the player that the saving operation provided from the player has been appropriately accepted by means of the audio or image output.

For example, in a situation where the player performs a first saving operation (for the first time), the registration means 44 registers, as saved data in the save slot A, the progress of the game at the timing when the first saving operation is performed. Subsequently, when the player performs a second saving operation, the registration means 44 copies (moves) the saved data in the save slot A to a save slot B. Then, the registration means 44 registers, as the saved data in the save slot A, the progress of the game at the timing when this second saving operation is performed. Subsequently, when the player performs a third saving operation, the registration means 44 copies the saved data in the save slot B to a save slot C. Thereafter, the registration means 44 copies the saved data in the save slot A to the save slot B. Then, the registration means 44 registers, as the saved data in the save slot A, the progress of the game at the timing when this third saving operation is performed.

In this way, every time a new saving operation is performed, the registration means 44 copies (moves) the saved data stored in the save slots A to F to the respective next sequent save slots, and stores, as the saved data in the save slot A, the progress of the game at the timing when this saving operation is performed. Here, in this embodiment, the registration means 44 discards (erases) the saved data (the oldest saved data) stored in the save slot G when the player performs the eighth or subsequent saving operation. That is, the registration means 44 stores the first to seventh newest saved data to the respective save slots (the save slot A to the save slot G).

The load accepting means 46 is functional means for accepting a loading operation from the player. In this embodiment, the load accepting means 46 accepts the loading operation of the saved data from the player on the play screen.

For example, the load accepting means 46 determines whether or not to accept the loading operation from the player. This loading operation is the continuation of the operation (e.g., the ON operation) for the operating tool associated with the loading operation. The continuation is, for example, the continuation of the operation for a predetermined period (e.g., one second). The loading operation includes, for example, a long-time operation (continuous operation) of the joystick in one direction or long-time pressing (continuous pressing) of a button.

Note that the operating tool is preferably one operating tool that is not associated with a playing operation of the game (e.g., the moving operation of the player object PO and the firing operation of the bullet object PB). In this embodiment, the loading operation is a long-time operation (long-time pressing operation) of one button (e.g., the C button) that is not associated with the playing operation of the game. That is, in this embodiment, the saving operation and the loading operation are operations for the same operating tool.

The load accepting means 46 determines whether or not the operation for the operating tool associated with the loading operation is further continued after receiving the loading operation. For example, the load accepting means 46 determines whether or not the operation (e.g., the pressing) for the operating tool (e.g., the C button) associated with the loading operation is further continued for a predetermined period (e.g., one second) after receiving the loading operation.

The control means 48 is functional means for controlling the entire game. In this embodiment, the control means 48 loads the registered saved data in chronological order every time the loading operation is performed, and restarts the game by switching the play screen of the game. For example, the control means 48 loads the registered saved data in the order of newest to oldest every time the loading operation is performed. Specifically, the control means 48 loads the saved data (progress) stored in the save slot A when the player performs the first loading operation, and then restarts the game by switching the play screen of the game. Subsequently, the control means 48 loads the saved data stored in the save slot B when the player performs the second loading operation, and then restarts the game by switching the play screen of the game.

In this way, the control means 48 loads the saved data stored in the save slots A to G in the order of newest to oldest every time a new loading operation is performed, and then restarts the game. Here, in this embodiment, when the player performs the eighth loading operation, the control means 48 loads the saved data stored in the save slot A as the first loading operation, and loops through the chronologically-ordered saved data to be loaded.

For example, the load accepting means 46 determines whether or not the operation for the operating tool associated with the loading operation is further continued after the loading operation is received by the load accepting means 46. Every time the determination is affirmative, the control means 48 loads the registered saved data in chronological order and switches the play screen. In this embodiment, every time the load accepting means 46 determines that the pressing time (the ON operation time) of the button (e.g., the C button) associated with the loading operation reaches the predetermined period (e.g., one second), the control means 48 loads the saved data from the save slot of the save information 40C in chronological order and switches the play screen. For example, when the predetermined period is one second, if the button (e.g., the C button) associated with the loading operation is continuously pressed for a period of n (n is an integer greater than or equal to 1) seconds or more and less than n+1 seconds, the control means 48 increments a value of a counter for loading (initial value of 0) (by +1) every time the predetermined time (one second) elapses. Then, the control means 48 loads the n-th newest saved data from the save slot and switches the play screen; the n-th refers to the value of the counter for loading. In this case, the control means 48 performs a combination of the loading of the saved data and the switching of the play screen n times through a series of loading operations.

In this embodiment, the control means 48 accepts the playing operation immediately after the play screen is switched and causes the game to progress. That is, the control means 48 starts moving each object immediately after switching the play screen. On the other hand, the control means 48 may interrupt (pause) the progress of the game until the operation of the operating tool (e.g., the C button) associated with the loading operation is released after the play screen is switched. That is, the control means 48 may stop the movement of each object after switching the play screen, and start the movement of each object after the operation of the operating tool associated with the loading operation is released.

Note that in this embodiment, when a value of the counter for loading is incremented so that the value exceeds the number of save slots (e.g., 7) storing the saved data, the control means 48 performs processing to return the value to "1".

In addition, the control means 48 may output (reproduce) audio for loading or output (display) an image showing that loading has been performed on the play screen, for example, every time the time during which the button (e.g., the C button) associated with the loading operation is continuously pressed reaches a predetermined period (e.g., one second). That is, the control means 48 may output audio for loading or an image when switching the play screen. The control means 48 may output different kinds of audio or images depending on the value of the counter for loading.

<Flow of Processing>

Figure 4:
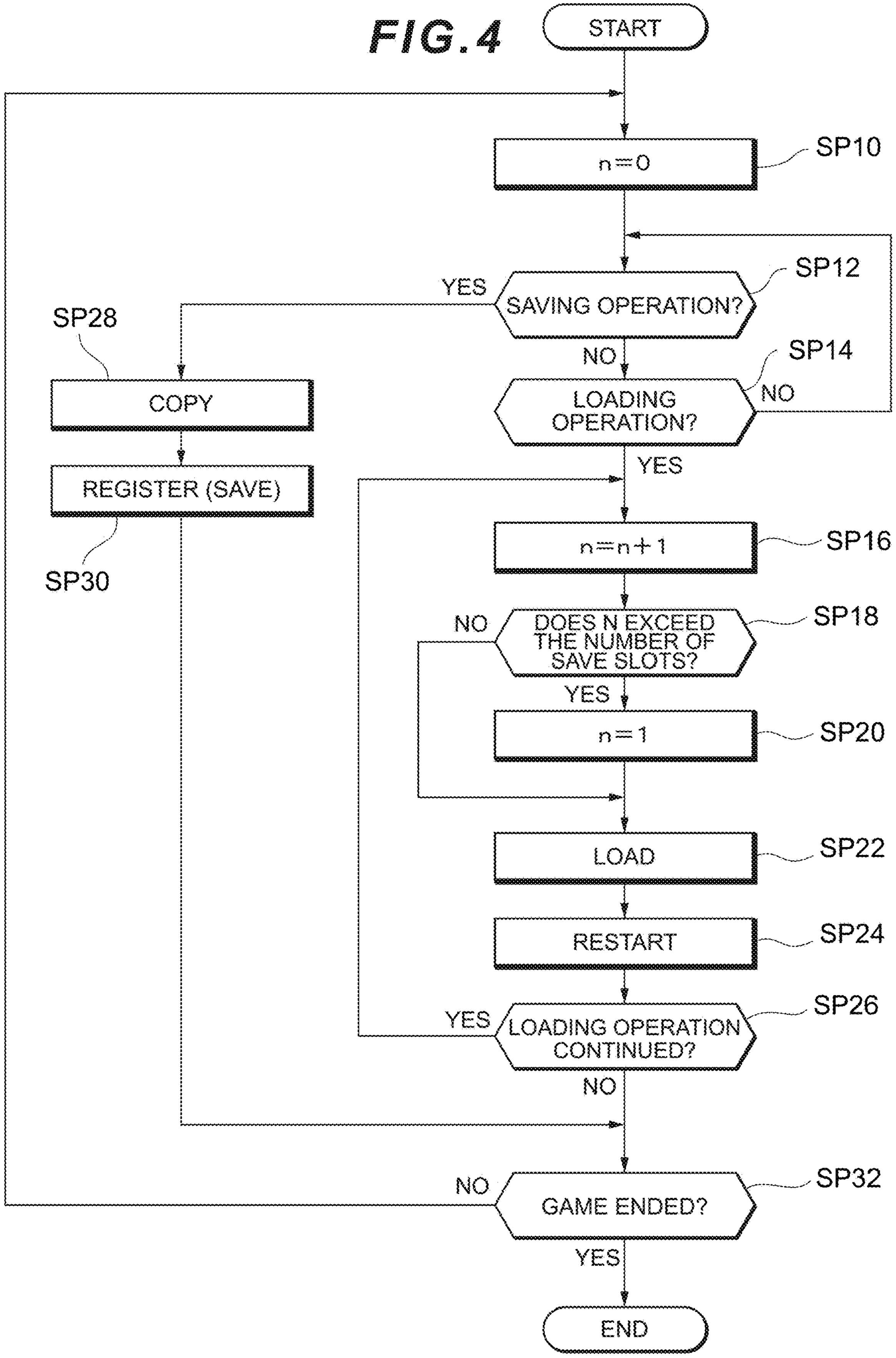
FIG. 4 is a flowchart showing an example of the flow of processing performed by each of the functional means shown in FIG. 3 in the game device according to this embodiment.

FIG. 4 is a flowchart showing an example of the flow of processing performed by each functional means shown in FIG. 3 in the game device according to this embodiment. The processing of the following steps is started, for example, at the timing when the player starts a shooting game and the play screen is displayed. The order and contents of the following steps may be changed as appropriate.

(Step SP10)

The control means 48 substitutes 0 for n, which is the counter for loading, thereby initializing it. Then, the processing proceeds to processing in step SP12.

(Step SP12)

The save accepting means 42 determines whether or not to accept the saving operation from the player. For example, the save accepting means 42 determines whether or not the operation (e.g., pressing) for the operating tool (e.g., the C button) associated with the saving operation is released (e.g., the release of the pressing) after this operation is performed for less than the predetermined period (e.g., one second). Then, if the determination is affirmative, the processing proceeds to processing in step SP28. On the other hand, if the determination is negative, the processing proceeds to processing in step SP14.

(Step SP14)

The load accepting means 46 determines whether or not to accept the loading operation from the player. For example, the load accepting means 46 determines whether or not the operation (e.g., pressing) for the operating tool (e.g., the C button) associated with the loading operation is further continued for a predetermined period (e.g., one second). Then, if the determination is affirmative, the processing proceeds to processing in step SP16. On the other hand, if the determination is negative, the processing proceeds to processing in step SP12.

(Step SP16)

The control means 48 increments n, which is the counter for loading, (by +1). Then, the processing proceeds to processing in step SP18.

(Step SP18)

The control means 48 determines whether or not n, which is the counter for loading, exceeds the number of save slots (e.g., 7) having stored therein the saved data. That is, the control means 48 determines whether or not "n" newly incremented in step SP16 reaches the number of save slots+1 (e.g., 8). Then, if the determination is affirmative, the processing proceeds to processing in step SP20. On the other hand, if the determination is negative, the processing proceeds to processing in step SP22.

(Step SP20)

The control means 48 substitutes 1 for n, which is the counter for loading. Thus, the control means 48 initializes (loops) the chronological order of the saved data to be loaded. Then, the processing proceeds to processing in step SP22.

(Step SP22)

The control means 48 loads the saved data (progress) stored in the save slot of the save information 40C according to the value of the counter for loading. Then, the control means 48 loads the n-th newest saved data from the save slot with reference to the save information 40C; the n-th refers to the value of the counter for loading. Specifically, when the value of the counter for loading is "1", the control means 48 loads the saved data (the first newest saved data) stored in the save slot A. When the value of the counter for loading is "2", the control means 48 loads the saved data (the second newest saved data) stored in the save slot B. Then, the processing proceeds to processing in step SP24.

(Step SP24)

Based on the saved data (progress) loaded in step SP22, the control means 48 switches the play screen of the game and restarts the game. That is, the control means 48 restarts the game from the state of the progress at the timing when the saving operation to store the saved data in the save slot is performed.

Figure 5A:
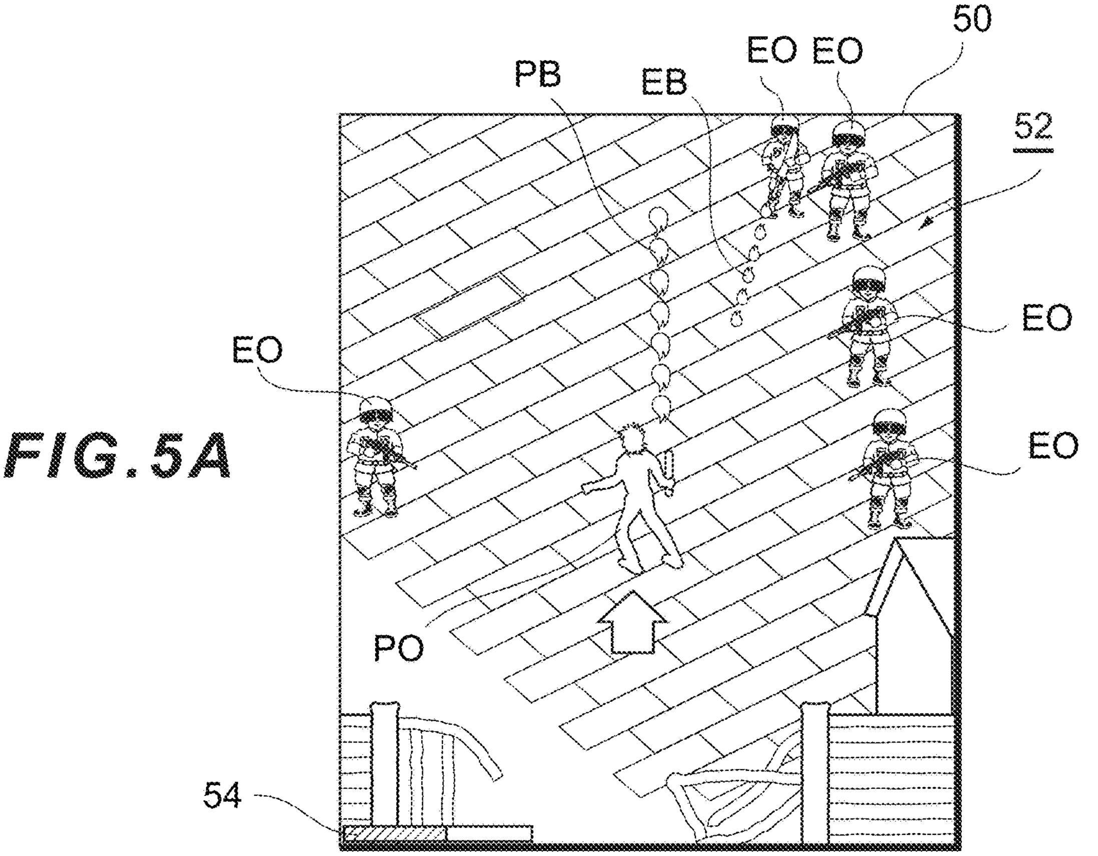
FIG. 5A is a diagram showing an example of the state of the play screen. In particular, this figure shows the state of the play screen before the loading operation is performed (before switching).
Figure 5B:
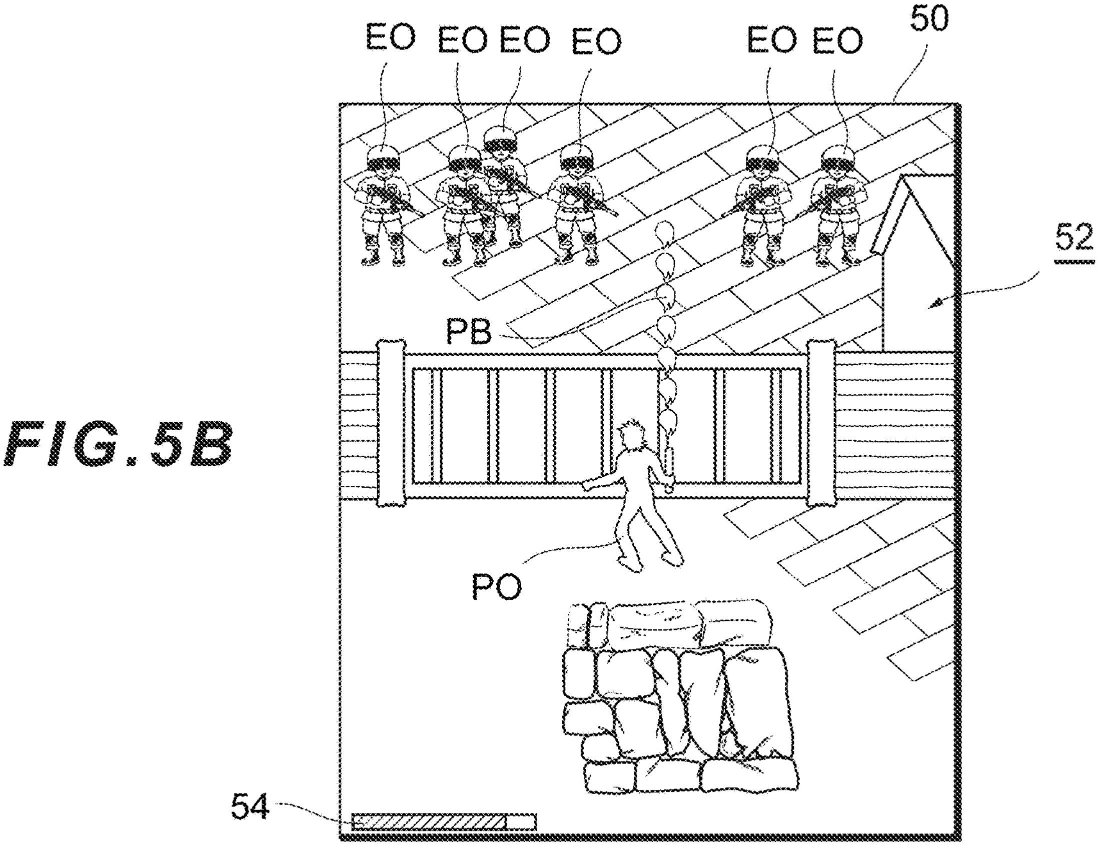
FIG. 5B is a diagram showing an example of the state of the play screen. In particular, this figure shows the state of the play screen after the loading operation is performed (after switching).

FIGS. 5A and 5B are diagrams showing examples of the states of the play screen 50. In particular, FIG. 5A is a diagram showing the state of the play screen 50 before the loading operation is performed (before switching), and FIG. 5B is a diagram showing the state of the play screen 50 after the loading operation is performed (after switching).

As shown in FIGS. 5A and 5B, when the loading operation is performed, the control means 48 controls the displayed game space 52, each object (player object PO, enemy object EO, bullet object PB, bullet object EB, etc.) represented in the game space 52, the HP display bar 54, etc., to return to the progress at the timing when the saving operation is performed. Note that when new saved data in terms of the chronological order is loaded after the gage is restarted by loading old saved data in terms of the chronological order, the progress (e.g., the number of stages) may advance.

Returning to FIG. 4, the processing proceeds to processing in step SP26.

(Step SP26)

After accepting the loading operation in step SP14, the load accepting means 46 determines whether or not the operation (e.g., pressing) for the operating tool (e.g., the C button) associated with the loading operation is further continued for a predetermined period (e.g., one second). That is, the load accepting means 46 makes negative determination if the operation (e.g., pressing) for the operating tool (e.g., the C button) associated with the loading operation is released in less than the predetermined period (e.g., one second) after receiving the loading operation in step SP14. Then, if the determination is affirmative, the processing proceeds to processing in step SP16. On the other hand, if the determination is negative, the processing proceeds to processing in step SP32.

(Step SP28)

The registration means 44 copies (moves) the saved data in each save slot to the next sequent save slot. Note that by this copying, the saved data stored in the last ordered save slot (e.g., the save slot G) is discarded. Then, the processing proceeds to processing in step SP30.

(Step SP30)

The registration means 44 registers (saves), as the saved data, the current progress of the game in the first ordered save slot of the save information 40C (e.g., the save slot A). Then, the processing proceeds to processing in step SP32.

(Step SP32)

The control means 48 determines whether or not the game is ended. For example, the control means 48 makes affirmative determination if the hit point of the player object PO becomes 0 or less (uncombattable) or if the hit point of a boss object (the enemy object EO) in the final stage becomes 0 or less (uncombattable). Then, if the determination is affirmative, the processing ends a series of processing shown in FIG. 4. On the other hand, if the determination is negative, the processing proceeds to processing in step SP10.

Specific Example 2

The above specific example 1 has described that the save accepting means 42 determines whether or not to accept the saving operation from the player in the above step SP12, but the saved data may be automatically registered in the save slot, regardless of the saving operation.

For example, the registration means 44 automatically registers the progress of the game as the saved data when a predetermined condition is satisfied during the play of the game. Examples of the predetermined condition include the progress of the game stage to a next one, the appearance of the boss object (the enemy object EO), the change of the form or action contents (stage) of the boss object, the state in which the boss object becomes uncombattable, the play time of the game reaching a multiple of the predetermined time (e.g., two minutes), the change (increase or decrease) of the hit point of the player object PO, and the like.

For example, in the above step SP12, the control means 48 determines whether or not this predetermined condition is satisfied. Then, if the determination is affirmative, the processing proceeds to processing in step SP28. On the other hand, if the determination is negative, the processing proceeds to processing in step SP14 described above.

Specific Example 3

The above specific example 1 has described a case in which the loading operation is the continuation of the operation (e.g., the ON operation) for the operating tool, but it may mean the release of the operation for the operating tool (e.g., the OFF operation) after this operation is continued.

For example, after the load accepting means 46 determines that the operating tool associated with the loading operation has been operated for the predetermined period (e.g., one second) or more, the control means 48 loads the saved data in chronological order every time the load accepting means 46 determines that this operation is released (e.g., the OFF operation). The loading operation includes, for example, the release of the long-time operation of the joystick or the release of the long-time pressing of the button. For example, in the above step SP26, the load accepting means 46 determines whether or not the loading operation is further performed within a certain time (e.g., five seconds) after the game is restarted in the above step SP24. Then, if the determination is affirmative, the processing proceeds to the above step SP16. On the other hand, if the determination is negative, the processing proceeds to the above step SP32.

In addition, the control means 48 may output (reproduce) audio or output (display) an image on the play screen when the time during which the operating tool associated with the loading operation is continuously performed reaches the predetermined period (e.g., one second), or when the operation is released.

For example, the control means 48 does not load the saved data (does not switch the play screen) while the load accepting means 46 determines that the operation for the operating tool associated with the loading operation is continuously performed. On the other hand, when the load accepting means 46 determines that the operation of the operating tool is released, the control means 48 loads the saved data according to the elapsed time during which the operating tool is performed and switches the play screen. For example, when the predetermined period is one second, if the button (e.g., the C button) associated with the loading operation is continuously pressed, the control means 48 increments the value of the counter for loading (initial value of 0) (by +1) every time one second elapses. Subsequently, the control means 48 loads the n-th newest saved data, which is the value of the counter for loading, from the save slot and switches the play screen when the button is continuously pressed for a period of n (n is an integer greater than or equal to 1) seconds or more and less than n+1 seconds and then the pressing of this button is released. In this case, the control means 48 performs a combination of the loading of the saved data and the switching of the play screen through a series of loading operations.

In addition, the control means 48 may output (reproduce) audio or output (display) an image on the play screen, for example, every time the duration in which the operating tool associated with the loading operation is continuously performed reaches the predetermined period (e.g., one second). That is, the control means 48 may output audio or an image when the value of the counter for loading is incremented. The control means 48 may output audio or an image when the operation of the operating tool is released.

Effects

As described above, in this embodiment, the computer is caused to function as: the save accepting means 42 for accepting a saving operation from a player on the play screen of a game; the registration means 44 for registering, as saved data, progress of the game at timing when the saving operation is performed, every time the saving operation is performed; the load accepting means 46 for accepting a loading operation of the saved data from the player on the play screen; and the control means 48 for loading the registered saved data in chronological order every time the loading operation is performed, and restarts the game by switching the play screen.

With this configuration, the saving operation and the loading operation can be performed on the play screen of the game without interrupting the game, thus reducing the player's operation labor. Further, the registered saved data is loaded in chronological order every time the loading operation is performed, so that the game can be restarted by switching the play screen, which can avoid reducing the immersion of the player in the game.

In this embodiment, the saving operation and the loading operation are operations for the same operating tool.

With this configuration, the saving operation and the loading operation are associated with the same operating tool, so that operational errors by the player can be reduced.

In this embodiment, the saving operation includes the operation for the operating tool and the release of the operation, while the loading operation is the continuation of the operation for the operating tool.

With this configuration, since the saving is performed by the operation for the operating tool and its release (the short-time operation or short-time pressing), the player can continue the playing operation smoothly after the saving operation. With this configuration, since the loading is performed by a continuous operation for the operating tool (the long-time operation or long-time pressing), the player can restart the game with leeway from the start of the loading operation and can perform the playing operation smoothly after the restart of the game.

In this embodiment, the load accepting means 46 determines whether or not the operation for the operating tool is further continued after receiving the loading operation, and every time the determination is affirmative, the control means 48 loads the registered saved data in chronological order and switches the play screen.

With this configuration, the saved data is loaded in chronological order every time the operation for the operating tool associated with the loading operation is continued after the loading operation, causing the gate to restart, whereby the player's labor of the loading operation can be reduced to avoid reducing the immersion of the player in the game.

In this embodiment, the control means 48 loads the registered saved data in the order of newest to oldest every time the loading operation is performed.

This configuration can enhance the convenience for players because new saved data, which requires fewer replays are loaded in order.

In this embodiment, the game is any of a shooting game, an action game, a music game, and a racing game.

With this configuration, in highly real-time games, the player's operation labor can be reduced to avoid reducing the immersion of the player in the game.

In this embodiment, the computer is caused to function as: the registration means 44 for automatically registering the progress of the game as the saved data when the predetermined condition is satisfied during play of the game; the load accepting means 46 for accepting a loading operation of the saved data from a player on the play screen of the game; and the control means 48 for loading the registered saved data in chronological order every time the loading operation is performed, and restarts the game by switching the play screen.

This configuration enables the automatic saving and the loading operation on the play screen of the game without interrupting the game, thus reducing the player's operation labor. Further, the registered saved data is loaded in chronological order every time the loading operation is performed, so that the game can be restarted by switching the play screen, which can avoid reducing the immersion of the player in the game.

Modifications

However, the present invention is not limited to the above-described specific examples. That is, the above specific examples with appropriate design changes made by those skilled in the art are also included in the scope of the present invention as long as they have the features of the present invention. Each of the elements included in the aforesaid embodiments and modifications described later can be combined to the extent technically possible, and the combination of these is also included within the scope of the present invention as long as it has the features of the present invention.

For example, in the above embodiment, the case where the operating tool associated with the saving operation and the loading operation is a button (e.g., the C button) or a joystick has been mainly described, but the operating tool may be a cross key or touchpad. The controller 22 may include a gyro sensor, and the saving operation or the loading operation may be performed by the movement (e.g., acceleration) and orientation (e.g., tilt) of this controller 22. In addition, the controller 22 may include a light emitter that is recognized by a camera provided in the game device 1, and the saving operation or the loading operation may be performed by the movement and orientation of the light emitter.

The above embodiments have described a case in which the operating tool associated with the saving operation and the loading operation is preferably one operating tool that is not associated with the playing operation of the game, but two or more operating tools may be used. For example, the saving operation may be performed by simultaneously pressing two buttons (e.g., the C and F buttons) for a short time, and the loading operation may be performed by simultaneously pressing two buttons (e.g., the C and F buttons) for a long time.

The above embodiments have described a case in which the operating tool associated with the saving operation and the operating tool associated with the loading operation are the same, but they may be different. In this case, the operating tool associated with the saving operation and the operating tool associated with the loading operation are preferably disposed close to each other (for example, adjacent to each other).

Note that the operating tools associated with the saving operation and the loading operation may be partially common. The saving operation may be performed by simultaneously pressing, for example, the C and F buttons for a short time, and the loading operation may be performed by simultaneously pressing, for example, the E and F buttons for a long time.

The above embodiments have described a case in which the save accepting means 42 accepts the saving operation on the play screen of the game, but the saving operation may be accepted on a screen different from the play screen (e.g., an interrupt screen of the play or the save screen). Since this saving operation is not an operation during the play of the game, an operating tool associated with the playing operation may be used. For example, this saving operation is an operation performed by selecting a save slot, in which the saving is performed, with the joystick and then pressing the determined button (e.g., the A button).

The save accepting means 42 may also accept a saving operation before or after the play of the game.

The above embodiments have described a case in which the load accepting means 46 accepts the loading operation on the play screen of the game, but the loading operation may be accepted also on a screen different from the play screen (e.g., an interrupt screen of the play or the loading screen). Since this loading operation is not an operation during the play of the game, an operating tool associated with the playing operation may be used. For example, this loading operation is an operation performed by selecting saved data to be loaded with the joystick and then pressing the determined button (e.g., the A button).

The load accepting means 46 may also accept a loading operation before or after the play of the game.

The above embodiments have described a case in which the registration means 44 outputs (reproduces) audio for saving or outputs (displays) an image by the saving operation, but an oscillator (for example, the vibration function) included in the controller 22 may vibrate the controller 22.

The above embodiments have described a case in which the control means 48 outputs (reproduces) audio for loading or outputs (displays) an image by the loading operation, but the oscillator included in the controller 22 may vibrate the controller 22.

The above embodiments have described a case in which the control means 48 loads the saved data every time the pressing time of the button (the ON operation time) associated with the loading operation reaches the predetermined period (e.g., one second), but this predetermined period may vary depending on the chronological order of the saved data to be loaded. For example, the predetermined period of the first loading operation (when loading the first newest saved data) may be one second, and the predetermined period of the second or subsequent loading operation (when loading the second or subsequent newest saved data) may be 0.5 seconds.

The above embodiments have described a case in which the control means 48 loads the registered saved data in the order of newest to oldest every time the loading operation is performed, but the control means 48 may load the saved data in the order of oldest to newest.

The control means 48 may load the saved data depending on the order of the progress of the game, every time the loading operation is performed. Examples of this order of the progress include the order of closeness to the final stage, the order of closeness (clear) to the end of the game, the order of longest to shortest play time, and the like.

The above embodiments have described a case in which the save information 40C has a plurality of (e.g., seven) save slots, but it may have one save slot. In this case, the control means 48 may not load the saved data in chronological order every time the loading operation is performed. When the storage unit 18 stores a plurality of game programs 20, the save information 40C may have one or more save slots for each of the game programs 20.

The above embodiments have described the memory 14 and the storage unit 18 as the recording medium, but the recording medium is not limited to the memory 14 or the storage unit 18. Examples of the recording medium include storage devices such as a hard disk (HDD: Hard Disk Drive) and a solid state drive (SSD: Solid State Drive) built in a computer system, and portable media such as an optical magnetic disk, a ROM (Read Only Memory), a CD (Compact Disc)-ROM, and a flash memory.

REFERENCE SIGNS LIST

1 Game device (computer, information processing device)
20 Game program (program)
40 Storage means
42 Save accepting means
44 Registration means
46 Load accepting means
48 Control means

The invention claimed is:

1. A non-transitory computer-readable recording medium having recorded therein a program that causes a computer to function as:

a save accepting unit that accepts a saving operation from a player on a play screen of a game;

a registration unit that registers, as saved data, progress of the game at timing when the saving operation is performed, every time the saving operation is performed;

a load accepting unit that accepts a loading operation of the saved data from the player on the play screen; and a control unit that loads the registered saved data in chronological order every time the loading operation is performed, and restarts the game by switching the play screen;

wherein an operation tool associated with the loading operation is one operating tool that is not associated with a playing operation for moving each object of the game, and wherein the saving operation and the loading operation are operations for a same operating tool, the saving operation is an operation for the operating tool and a release of the operation, and the loading operation is continuation of the operation for the operating tool.

2. The computer-readable recording medium according to claim 1, wherein the load accepting unit determines whether or not the operation for the operating tool is further continued after receiving the loading operation, and the control unit loads the registered saved data in chronological order every time the determination is affirmative, and switches the play screen.

3. The computer-readable recording medium according to claim 1, wherein the control unit loads the registered saved data in an order of newest to oldest every time the loading operation is performed.

4. The computer-readable recording medium according to claim 1, wherein the game is any of a shooting game, an action game, a music game, and a racing game.

5. An information processing device comprising:

a save accepting unit that accepts a saving operation from a player on a play screen of a game;

a registration unit that registers, as saved data, progress of the game at timing when the saving operation is performed, every time the saving operation is performed;

a load accepting unit that accepts a loading operation of the saved data from the player on the play screen; and a control unit that loads the registered saved data in chronological order every time the loading operation is performed, and restarts the game by switching the play screen;

wherein an operation tool associated with the loading operation is one operating tool that is not associated with a playing operation for moving each object of the game, and wherein the saving operation and the loading operation are operations for a same operating tool, the saving operation is an operation for the operating tool and a release of the operation, and the loading operation is continuation of the operation for the operating tool.

* * * * *